United States Patent Office 3,773,957
Patented Nov. 20, 1973

3,773,957
ACETOPHENONE ANORECTIC METHOD
Abdulmuniem H. Abdallah, Zionsville, Ind., assignor to The Dow Chemical Company, Midland, Mich.
No Drawing. Filed Mar. 1, 1971, Ser. No. 119,825
Int. Cl. A61k *27/00*
U.S. Cl. 424—273
6 Claims

ABSTRACT OF THE DISCLOSURE

There is disclosed herein a method useful for suppression of appetite and reduction of food intake in animals by means of administering to animals an anorectic amount of a compound corresponding to the formula:

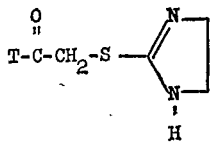

wherein T represents 3-trifluoromethylphenyl, 4-fluorophenyl, 3,4-dichlorophenyl or 3,4-difluorophenyl, or a pharmaceutically-acceptable salt thereof.

BACKGROUND OF THE INVENTION

Para-substituted 2-phenacylmercapto - 2 - imidazoline compounds, e.g., p-bromo and p-chloro, are described by Fefer and King, J. Org. Chem., 26, 828 (1961); however, no utility for these compounds has been established. It has now been discovered that [3′,4′-dichloro-], [3′,4′-difluoro-], [3′-trifluoromethyl-] and [4′-fluoro-] substituted 2-(2-imidazolin-2-ylthio)acetophenone compounds and their pharmaceutically-acceptable salts have potent anorectic or anorexigenic properties, whereas the known [p-bromo] and [p-chloro] -2-phenacylmercapto-2-imidazoline compounds have been found to be of minimal anorectic activity.

Other phenacylthio heterocyclic compounds which do not anticipate or render obvious the compounds employed in the present method are described in U.S. Pat. No. 3,507,869.

SUMMARY OF THE INVENTION

The present invention is directed to a method which comprises administering to a host animal an anorectic amount of a compound corresponding to the formula:

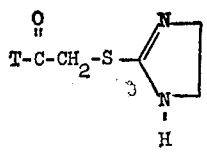

wherein T represents 3-trifluoromethylphenyl, 4-fluorophenyl, 3,4-dichlorophenyl or 3,4-difluorophenyl, a pharmaceutically-acceptable salt thereof, or a composition containing such acetophenone compound or salt as the active anorectic ingredient therein. For the purpose of brevity, these compounds will hereinafter be referred to as the "acetophenone" compounds. The method of the present invention is particularly useful for suppression of appetite in controlling the food intake and weight of animals, particularly obese animals or mammals having a tendency toward obesity.

It has been found that the acetophenone compounds and their pharmaceuticaly-acceptable salts have potent anorectic or anorexigenic properties. The acetophenone compounds have relatively little or no stimulant effect on the cardiovascular system at dosages consistent with good anorectic activity. The acetophenone compounds are crystalline solids which are of low solubility in many of the common organic solvents such as benzene and acetone, and of varying degrees of solubility in water. The pharmaceutically-acceptable salts are crystalline solids which are similarly of low solubility in common organic solvents and of moderate solubility in water.

As employed herein, the phrase "pharmaceutically-acceptable salt" refers to acid addition salts of the acetophenone compounds, the anions of which are relatively non-toxic and innocuous to animals at dosages consistent with good anorectic activity so that side effects ascribable to the anions do not vitiate the beneficial effects of the acetophenone compounds. Suitable pharmaceutically-acceptable salts which can be employed in the methods and composition of the invention include those derived from mineral acids such as the hydrochloride, hydrobromide, phosphate, nitrate and sulfate salts, those derived from organic carboxylic acids such as the succinate, tartrate, citrate, malate, maleate, and acetate salts and those derived from organic sulfonic acids such as the methanesulfonate and toluenesulfonate salts. The active acetophenone compounds are preferably employed in the form of pharmaceutically-acceptable salts and the preferred form is the hydrobromide salt.

In accordance with the method of the present invention, an anorectic amount of acetophenone compound or a pharmaceutically-acceptable salt thereof is administered to a host animal. The administration of an anorectic amount of acetophenone compound to an animal brings about a suppression of appetite in the animal. The method of the invention can thus be employed to reduce symptoms and responses to hunger in mammals exhibiting the same, and in reducing food intake by such animals as in reducing or controlling the weight thereof. The method of the invention is advantageously employed by administration of the anorectic amount of acetophenone compound to a hungry animal, that is, an animal which is predisposed to ingest food due to such factors as training or habituation to a schedule of feeding, duration of time elapsed since previous feeding (starvation), reduced blood sugar levels and/or gastrointestinal motility associated with hunger, stimuli such as scent or sight of food, and the like. Anorexia or suppressed appetite resulting from administration of the required dosage of such compound is usefully manifested by decreased food intake when the treated animal is presented with food during a period in which the appetite of such animal is suppressed by the method of the invention, in the absence of observable side effects or discomfort to the treated animal. Such reduction in food intake, as compared to normal food intake by the same or similar animals, can be utilized in bringing about a desired weight loss or controlling undesired weight gain while alleviating physical discomfort of hunger associated with such decreased food intake.

In a preferred procedure, an anorectic amount of the active acetophenone compound or a composition containing the same is administered to an obese mammal or a mammal having a tendency toward obesity, such as an animal which, due to habit, physical restraint or limitation, training, or other factors consumes food in quantities sufficient to bring about undesired weight gain. The anorectic amount of compound, that is, the amount of the acetophenone compound sufficient to produce reduced appetite or reduced food intake depends on various factors such as the size, type and age of the animal to be treated, the pharmaceutically-acceptable salt employed, the route of administration, the duration of anorectic effect desired, the time the compound is administered relative to prior and subsequent presentation of food, or established feeding patterns or schedules; provided, however, that the animal is administered sufficient of the active acetophenone compound to provide a substantial reduction in the appetite as indicated by reduction in food intake.

Generally, anorexia is induced in a host animal by the oral administration of from about 1 to about 250 or more milligrams of the acetophenone compound per kilogram of animal body weight. When administered by intraperitoneal injection, good results are obtained with an anorectic amount of from 1 to about 50 or more milligrams of acetophenone compound per kilogram of animal body weight.

In order to provide adequate dosage forms, the present invention also contemplates incorporating the active acetophenone compounds in solid or liquid unit dosage forms such as tablets, capsules, lozenges, elixirs, syrups, suspensions and the like, or in other forms readily subdividable into unit dosage forms. The active acetophenone compounds can also be formulated in conventional timed release capsule or tablet formulations, in which case the preferred dosage per unit is from about 50 milligrams or less to about 300 milligrams or more per unit.

In practicing the method of the invention, the active ingredient is preferably incorporated in a composition comprising a pharmaceutical carrier and from about 5 to about 90 percent by weight of the acetophenone compound or a pharmacologically-acceptable salt thereof. The term "pharmaceutical carrier" refers to known pharmaceutical excipients useful in formulating pharmacologically-active compounds for internal administration to animals, and which are substantially non-toxic and non-sensitizing under conditions of use. The compositions can be prepared by known techniques for the preparation of tablets, capsules, lozenges, troches, elixirs, syrups, emulsions, dispersions, wettable and effervescent powders, sterile injectable compositions, sterile parenteral compositions for implantation, and the like, and can contain suitable excipients known to be useful in the preparation of the particular type of composition desired. The compositions are then administered to animals and in particular to obese mammals or to mammals having a tendency toward obesity in an amount sufficient to constitute dosage of said animal with an anoretic amount of the active compound.

Suitable pharmaceutical carriers which can be employed in formulating solid compositions include lactose, glucose, gelatin, rice flour, starch, malt, magnesium carbonate, magnesium stearate and the like and compatible mixtures thereof. Liquid non-toxic carriers which can be employed in preparing liquid compositions include ethanol, propylene glycol, water, glycerine, normal saline, glucose syrup, syrup of acacia, mucilage of tragacanth and the like and compatible mixtures thereof. Oil-in-water and water-in-oil emulsions can be prepared with edible oils such as peanut oil, wheat germ oil, corn oil, arachis oil, olive oil or the like and with the aid of emulsifying agents such as lecithin, sorbitan trioleate, polyoxyethylene sorbitan monooleate, gum acacia and the like. Suspensions can be prepared with the aid of suspending agents such as methyl cellulose, carboxymethyl cellulose, hydroxypropylmethyl cellulose and polyethyleneoxide condensation product with alkylphenols, fatty acids or fatty alcohols and the like and compatible mixtures thereof. Preferred compositions contain either a suspending agent or an emulsifying agent, or both. The compositions can also contain sweetening agents such as sugar or sodium saccharin, flavoring agents such as sugar or sodium saccharin, flavoring agents such as licorice, coloring materials such as caramel, preservatives and the like. The active ingredient can also be incorporated in sterile parenteral compositions for intraperitoneal, intramuscular, intravenous or subcutaneous injection. Such compositions are preferably prepared with pharmaceutical carriers such as water, normal saline and the sterile injectable suspensions can also include suspending agents such as those listed above.

DESCRIPTION OF PREFERRED EMBODIMENTS

The following examples illustrate the invention but are not to be construed as limiting the same.

Example 1

Separate sterile injectable compositions comprising 4'-fluoro-2-(2 - imiadzolin-2-ylthio)acetophenone hydrobromide, 3',4'-dichloro-2-(2 - imidazolin-2-ylthio)acetophenone hydrobromide and 3',4'-difluoro-2-(2-imidazolin-2-ylthio)acetophenone hydrobromide in a 0.5 percent aqueous hydroxypropyl methyl cellulose suspension were prepared and administered to separate groups of mice. The compounds were administered at various dosage rates by intraperitoneal injection. Prior to administration of the acetophenone compounds, the mice have been trained to eat a conventional rodent chow during a six hour period daily, the mice being presented with water ad libitum, but no food during the remaining 18 hours each day. The acetophenone compounds are administered about 17 to 18 hours following the end of the latest feeding period. After administration of the compounds, the mice in each group are presented with a weighed amount of rodent chow. Separate groups of similar mice are similarly trained, starved and presented with food to serve as a check. However, the check groups are administered only a 0.5 percent aqueous hydroxypropyl methyl cellulose suspension containing no acetophenone compound. Feed consumption by the groups of mice is determined after one hour and three hours, respectively, by weighing the rodent chow remaining at such times, and recording the difference in weight between feed presented and feed remaining as food consumption or food intake. By comparing the average group food intake of the control mice with the average group food intake of the treated mice, the percent reduction of food intake in the treated mice is calculated. Table I shows the results obtained.

TABLE I.—ANORECTIC ACTIVITY OF ACETOPHENONE COMPOUNDS

| Run No. | Test compound | Dose, mg./kg. | Percent reduction of food intake after— | |
|---|---|---|---|---|
| | | | 1 hour | 3 hours |
| 1a | 3',4'-dichloro-2-(2-imidazolin-2-ylthio)acetophenone hydrobromide | 10 | 38 | 16 |
| 1b | do | 21 | 60 | 36 |
| 1c | do | 46 | 88 | 58 |
| 2a | 4'-fluoro-2-(imidazolin-2-ylthio)acetophenone hydrobromide | 10 | 12 | 16 |
| 2b | do | 21 | 31 | 16 |
| 2c | do | 46 | 76 | 35 |
| 3a | 3',4'-difluoro-2-(2-imidazolin-2-ylthio)acetophenone hydrobromide | 10 | 16 | 0 |
| 3b | do | 21 | 43 | 22 |
| 3c | do | 46 | 85 | 46 |

Example 2

In procedures similar to those in Example 1, separate test groups of mice are administered 3',4'-dichloro-2-(2-imidazolin - 2 - ylthio)acetophenone hydrobromide, 4'-fluoro - 2 - (2 - imidazolin-2-ylthio)acetophenone hydrobromide or 3',4' - difluoro - 2 - (2-imidazolin-2-ylthio) acetophenone hydrobromide orally at various dosage rates. Feed consumption by the treated groups and control groups of mice is determined after one and three hours, respectively, and the percent reduction of food intake in the treated mice is determined. The percent reduction of food intake in the treated mice obtained at the various dosage rates of acetophenone compound employed after one and three hours, respectively, is set forth in the following table:

compound per kilogram, the average time for onset of anorectic activity is 0.8 hours and the average duration of

TABLE II.—ANORECTIC ACTIVITY OF ACETOPHENONE COMPOUNDS

| Run No. | Test compound | Dose, mg./kg. | Percent reduction of food intake after— | |
|---|---|---|---|---|
| | | | 1 hour | 3 hours |
| 1a | 3',4'-dichloro-2-(2-imidazolin-2-ylthio)acetophenone hydrobromide | 10 | 27 | 20 |
| 1b | dog | 21 | 43 | 12 |
| 1c | do | 46 | 92 | 34 |
| 2a | 4'-fluoro-2-(imidazolin-2-ylthio)acetophenone hydrobromide | 10 | 31 | 33 |
| 2b | do | 21 | 24 | 11 |
| 2c | do | 46 | 54 | 37 |
| 3a | 3',4'-difluoro-2-(2-imidazolin-2-ylthio)acetophenone hydrobromide | 10 | 16 | 3 |
| 3b | do | 21 | 15 | 0 |
| 3c | do | 46 | 55 | 12 |

Example 3

Separate groups of rats are presented with milk, and the milk consumption of each rat during a thirty minute period on two successive days prior to oral or intraperitoneal administration of an acetophenone compounds is recorded. Milk consumption during a comparable thirty minute period following administration of a test compound at various dosage rates is recorded and the average milk intake before and after administration of the acetophenone compound employed is compared in the following Table III.

activity is observed to be 3.4 hours. No emesis, or symptoms or responses other than anorexia are observed in any of the dogs.

Example 5

Cats are trained to eat their daily ration of a conventional cat chow in a single portion presented to the animals during a one hour period each day. The animals are given water ad libitum, but no food during the remaining 23 hours daily. Immediately prior to feeding (22–23 hours after the last feeding) separate groups of cats so trained and prepared are administered 3',4'-dichloro-2-(2-imid-

TABLE III.—ANORECTIC EFFECT OF ACETOPHENONE COMPOUNDS ON MILK INTAKE OF RATS

| Run No. | Compound | Mode of administration | Dose, mg./kg. | Milk intake in milliliters in 30 minute intervals | | Percent reduction of food intake after— |
|---|---|---|---|---|---|---|
| | | | | Pre-treatment | Post-treatment | |
| 1a | 3',4'-dichloro-2-(imidazolin-2-ylthio)acetophenone hydrobromide | Oral | 2.1 | 19.3 | 16.4 | 15 |
| 1b | do | do | 4.6 | 17.6 | 9.0 | 49 |
| 1c | do | do | 10.0 | 10.5 | 7.2 | 65 |
| 1d | do | do | 21.0 | 16.1 | 3.1 | 81 |
| 1e | do | do | 46.0 | 21.1 | 3.2 | 85 |
| 2a | do | Intraperitoneal | 1.0 | 19.9 | 9.7 | 51 |
| 2b | do | do | 2.1 | 18.2 | 10.9 | 40 |
| 2c | do | do | 4.6 | 17.2 | 4.6 | 73 |
| 2d | do | do | 10.0 | 17.3 | 3.1 | 82 |
| 2e | do | do | 21.0 | 15.6 | 0.1 | 99 |
| 3a | 4'-fluoro-2-(2-imidazolin-2-ylthio)acetophenone hydrobromide | Oral | 4.6 | 15.9 | 17.5 | 0 |
| 3b | do | do | 10.0 | 18.2 | 17.7 | 3 |
| 3c | do | do | 21.0 | 15.3 | 7.7 | 50 |
| 3d | do | do | 46.0 | 17.3 | 10.8 | 38 |
| 4a | do | Intraperitoneal | 4.6 | 19.2 | 18.4 | 4 |
| 4b | do | do | 10.0 | 17.5 | 7.7 | 56 |
| 4c | do | do | 21.0 | 16.8 | 10.0 | 41 |
| 4d | do | do | 46.0 | 17.8 | 4.4 | 75 |
| 5a | 2-((2-imidazolin-2-ylthio)-3'-trifluoromethyl)acetophenone hydrobromine | Oral | 10.0 | 15.6 | 17.4 | 0 |
| 5b | do | do | 21.0 | 17.1 | 17.3 | 0 |
| 5c | do | do | 46.0 | 17.6 | 12.5 | 29 |
| 6a | do | Intraperitoneal | 10.0 | 19.0 | 15.1 | 20 |
| 6b | do | do | 21.0 | 16.0 | 12.5 | 21 |
| 6c | do | do | 46.0 | 16.0 | 9.3 | 4 |

Example 4

Mongrel dogs are starved overnight and are then orally administered 3',4' - dichloro - 2-(2-imidazolin-2-ylthio)-acetophenone hydrobromide at a dosage rate of 10 or 15 milligrams per kilogram. Five dogs are administered the test compound in gelatin capsules at each rate. At 30-minute intervals following administration, each dog is presented a small portion of a meat and cereal dog ration. In a similar untreated check group of dogs, the food portion is uniformly consumed within about 30 minutes of presentation each time such food is presented. When a dog fails to ingest the food portion within 30 minutes after presentation, the food portion is replaced with a fresh portion and the observation is recorded as an anorectic effect, the time of such observation being recorded as time for onset of anorectic activity. Presentation of the food portions is continued until the dog consumes a food portion when presented. The time interval between onset of anorectic activity and consumption of food when presented is recorded as duration of anorectic activity. The average time for onset of anorectic activity in the dogs administered 10 milligrams of the test compound per kilogram is observed to be 1.3 hours and the average duration of activity observed is 2.9 hours. In the dogs administered 15 milligrams of the acetophenone azolin - 2 - ylthio)acetophenone hydrobromide per os in capsule form at various dosage rates. Food intake during the one hour feeding period is measured and compared with the food intake during the one hour feeding period on the day prior to treatment. An ED$_{50}$, calculated as the dosage effective to reduce food intake by 25 percent or more in 50 percent of the cats, for 3',4'-dichloro-2-(2-imidazolin - 2 - ylthio)acetophenone is found to be 3 milligrams per kilogram. No emesis, nausea or symptoms or responses other than anorexia are observed in any of the cats.

The following example is included to illustrate the preparation of a representative dosage form:

Example 6

15 parts by weight of 3',4' - dichloro - 2 - (2-imidazolin - 2 - ylthio)acetophenone hydrobromide, 100 parts of corn starch and 3 parts of magnesium stearate are intimately mixed together and the mixture is compressed into slugs. The slugs are broken into granules which are passed through an eight mesh screen and coated with sufficient of a solution of 15 parts of shellac and 3 parts of castor oil in 800 parts of ethanol to coat the granules. Three parts of magnesium stearate are then added to the coated granules after which they are compressed into tablets weighing 750 milligrams each. The tablets are adapted to be administered to animals, such as obese mammals, in which reduction of food intake is desired.

The acetophenone compounds employed in the methods of the present invention are prepared by the reaction of a corresponding α-haloacetophenone compound with ethylenethiourea. The reaction is carried out in the presence of an inert organic solvent, such as, for example, acetone, ethanol, acetonitrile and the like, at a temperature of from about 0 to about 35° C. Equimolar proportions of the reactants are usually employed and the reaction is generally complete after a period of from about 1 to about 24 hours. Following the completion of the reaction, the desired acetophenone product is recovered from the reaction mixture by the use of conventional techniques.

I claim:

1. A method for reducing the food intake of obese animals the method comprising administering internally to such an animal an anorectic amount of a compound corresponding to the formula:

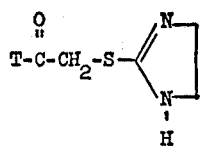

wherein T represents 3 - trifluoromethylphenyl, 4 - fluorophenyl, 3,4 - dichlorophenyl or 3,4 - difluorophenyl, or a pharmaceutically-acceptable salt thereof.

2. The method of claim 1 wherein the compound is 3',4' - dichloro - 2 - (2 - imidazolin-2-ylthio)acetophenone hydrobromide.

3. The method of claim 1 wherein the compound is 4' - fluoro - 2 - (2 - imidazolin-2-ylthio)acetophenone hydrobromide.

4. The method of claim 1 wherein the compound is 2 - ((2 - imidazolin - 2 - ylthio)-3'-trifluoromethyl)acetophenone hydrobromide.

5. The method of claim 1 wherein the compound is 3',4' - difluoro - 2 - (2 - imidazolin - 2 - ylthio)acetophenone hydrobromide.

6. The method of claim 1 wherein the compound is administered orally at a dosage rate of from about 1 to about 250 milligrams per kilogram of animal body weight.

References Cited
UNITED STATES PATENTS
3,507,869  4/1970  Houlihan _____ 424—251

OTHER REFERENCES
J. Organic Chemistry (Fefer), 1961, 26, pp. 828–835.

ALBERT T. MEYERS, Primary Examiner
N. A. DREZIN, Assistant Examiner

U.S. Cl. X.R.
424—358

FU-1050
(5/69)

UNITED STATES PATENT OFFICE
CERTIFICATE OF CORRECTION

Patent No. 3,773,957            Dated November 20, 1973

Inventor(s) Abdulmuniem H. Abdallah

It is certified that error appears in the above-identified patent and that said Letters Patent are hereby corrected as shown below:

Column 4, line 20, correct spelling of "imidazolin";

Column 5, Table II, Run No. 1b, change "dog" to "do";

Column 5, line 19, change "compounds" to "compound";

Column 6, Table III, under column headed "Percent reduction of food intake after", delete the word "after";

Column 6, Table III, under column headed "Pre-treatment", third number down, change "10.5" to "20.5";

Column 6, Table III, under column headed "Compound", Run No. 5a, change "hydrobromine" to "hydrobromide";

Column 6, Table III, under column headed "Percent reduction of food intake", last figure in column, change "4" to read "42" and delete the sub no. 2 from beneath the Table.

Signed and sealed this 17th day of September 1974.

(SEAL)
Attest:

McCOY M. GIBSON JR.            C. MARSHALL DANN
Attesting Officer              Commissioner of Patents

C-15,184